United States Patent Office 3,847,931
Patented Nov. 12, 1974

3,847,931
OXADIAZOLIDINE-3,5-DIONES
Bernd Zeeh, Ludwigshafen, Wolfgang Rohr, Mannheim, Karl-Heinz Koenig, Frankenthal, and Adolf Fischer, Mutterstadt, Germany, assignors to Badische Anilin- & Soda-Fabrik Aktiengesellschaft, Ludwigshafen (Rhine), Germany
No Drawing. Filed Jan. 26, 1972, Ser. No. 221,064
Claims priority, application Germany, Feb. 5, 1971, P 21 05 378.1
Int. Cl. C07d 85/52
U.S. Cl. 260—307 B                     4 Claims

ABSTRACT OF THE DISCLOSURE

4-Methyl-2-[m-aliphatic carbamoyloxyphenyl]-3,5-substituted 1,2-oxadiazolidine-diones having a strong herbicidal action; herbicides containing these compounds as active ingredients; and a process for controlling the growth of unwanted plants with these compounds.

---

The present invention relates to new and valuable substituted 1,2,4-oxadiazolidine-3,5-diones and their use as herbicides.

It is known that 1,2,4-oxadiazolidine-3,5-diones, e.g. 2-(m - dimethylcarbamoyloxyphenyl) - 4 - methyl - 1,2,4-oxadiazolidine-3,5-dione (Belgian Pat. 714,355, French Pat. 1,560,971), have a herbicidal action. However, their action is unsatisfactory because the unwanted plants are insufficiently damaged.

We have now found that substituted 1,2,4-oxadizolidine-3,5-diones of the formula

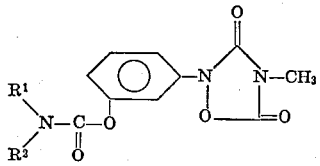

where $R^1$ denotes alkenyl or alkynyl having from 3 to 6 carbon atoms or lower alkyl having from 1 to 4 carbon atoms and substituted one or more times by halogen, e.g. chlorine, bromine and $R^2$ denotes hydrogen or lower alkyl having 1 to 4 carbon atoms (methyl, ethyl, propyl, isopropyl, butyl, tert-butyl, isobutyl), have a good herbicidal action.

The active ingredients are for example suitable for use as selective herbicides in cereals, Indian corn, sorghum and peanuts, or as total herbicides for completely destroying all plant growth. The good action of the active ingredients of the invention is particularly in evidence on Poa spp., Lolium spp., Echinochloa spp., Setaria spp., and Sinapis spp. at application rates of 0.5 to 5 kg. per hectare.

The preparation of the compounds of the invention is illustrated below; parts are by weight. The active ingredients are generally prepared by reacting 2-(m-chlorocarbonyloxyphenyl) - 4 - methyl - 1,2,4 - oxadiazolidine-3,5-dione with appropriate amines or salts of amines in the presence of a base. The substituted oxadiazolidine-dione is obtainable by reaction of 2-(m-hydroxyphenyl)-4-methyl-1,2,4-oxadiazolidine-2,4-dione with phosgene.

EXAMPLE 1

At a temperature of 70° to 80° C. and with stirring, 52 parts of zinc dust is added in portions to a suspension of 41.7 parts of 3-nitrophenol and 6.5 parts of ammonium chloride in 75 parts of water and 150 parts of ethanol. The mixture is subsequently filtered and, at 20° to 30° C., 45.5 parts of methyl N-methyl-N-chlorocarbonyl carbamate is added to the filtrate. The precipitate which forms is suction filtered, washed with dilute alcohol and dried. There is obtained 52 parts of 2-(m-hydroxyphenyl)-4-methyl-1,2,4-oxadiazolidine-3,5-dione which decomposes at 175° C.

The compound has the following structural formula:

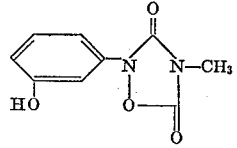

104 parts of 2-(m-hydroxyphenyl)-4-methyl-1,2,4-oxadiazolidine-3,5-dione is dissolved in 420 parts of absolute dioxane and 60 parts of N,N-dimethylaniline. At 10° to 20° C., 50 parts of phosgene is passed into this solution. Subsequently the mixture is heated at 70° C. for 2 hours and allowed to cool. The solution is then poured onto 500 parts of ice water and the precipitate formed is suction filtered. There is obtained 77 parts of 2-(m-chlorocarbonyloxyphenyl) - 4 - methyl - 1,2,4 - oxadiazolidine-3,5-dione which decomposes at 104° to 106° C.

13.5 parts of 2 - (m - chlorocarbonyloxyphenyl) - 4-methyl-1,2,4-oxadiazolidine-3,5-dione is dissolved in 50 parts of dioxane; at 5° to 10° C., 8.5 parts of 3-methyl-3-aminobutene-(1) is dripped in while stirring. After 1 hour the mixture is filtered and the filtrate poured onto 200 parts of water. The precipitate which forms is suction filtered and dried in vacuo. There is obtained 8.5 parts of 2 - [m - (3 - methylbuten - (1) - yl - (3)) - carbamoyloxyphenyl]-4-methyl-1,2,4-oxadiazolidine-3,5-dione melting at 95° to 97° C. After recrystallization from ethylene chloride the melting point rises to 103° to 105° C.

The compound has the following structural formula:

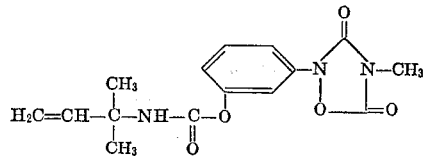

Instead of the amine used in Example 1, it is also possible to use an amine salt, e.g. an amine hydrochloride.

EXAMPLE 2

13.5 parts of 3-(m-chlorocarbonyloxyphenyl)-4-methyl-1,2,4-oxadiazolidine-3,5-dione and 5.3 parts of 3-aminobutyne-(1) hydrochloride are suspended in 50 parts of dioxane. At 10° to 20° C. and with stirring, a solution of 4 parts of caustic soda in 10 parts of water is dripped into the suspension. After 2 hours the mixture is suction filtered and the filtrate poured onto 200 parts of water. The precipitate which forms is suction filtered, washed with water and dried in vacuo. There is obtained 13 parts of 2-(m - butyn - (1) - yl - (3) - carbamoyloxyphenyl)-4-methyl-1,2,4-oxadiazolidine-3,5-dione melting at 129° to 131° C. After recrystallization from ethylene chloride the melting point is 139° to 140° C.

Table 1 gives a number of compounds prepared by the above methods:

TABLE 1

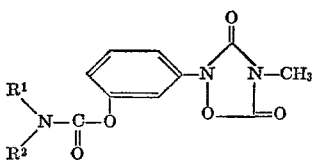

| R¹— | R²— | Molecular formula | M.P. [° C.] |
|---|---|---|---|
| C₂H₅\CH—/ClCH₂ | H— | C₁₄H₁₆ClN₃O₅ (341.8) | 118–119 |
| Cl—CH₂—C(CH₃)(CH₃)— | H— | C₁₄H₁₆ClN₃O₅ (341.8) | 101–102 |
| BrCH₂—CHBr\CH—/H₃C | H— | C₁₄H₁₅Br₂N₃O₅ (465.1) | 88–90 |
| H₃C\CH—/HC≡C | H— | C₁₄H₁₃N₃O₅ (303.3) | 139–140 |
| HC≡C—C(CH₃)(CH₃)— | H— | C₁₅H₁₅N₃O₅ (317.3) | 114–116 |
| HC≡C—C(CH₃)(C₂H₅)— | H— | C₁₆H₁₇N₃O₅ (331.3) | 83–85 |
| H₃C\CH—/HC≡C | CH₃— | C₁₅H₁₅N₃O₅ (317.3) | 72–74 |
| H₃C\CH—/HC≡C | H₃C\CH—/H₃C | C₁₇H₁₉N₃O₅ (345.4) | 148–150 |
| H₂C=CH\CH—/H₃C | H— | C₁₄H₁₅N₃O₅ (305.3) | 113–115 |

The compounds according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

It is also possible to add insecticides, fungicides, bactericides and other herbicides.

The following examples demonstrate the use of the compounds of the invention.

EXAMPLE III

In a greenhouse, loamy sandy soil was filled into pots and sown with *Triticum aestivum, Zea mays, Sinapis arvensis, Lamium amplexicaule, Poa trivialis, Lolium perenne* and *Echinochloa crus-galli*. The soil prepared in this manner was then sprayed with 1 kg. per hectare of each of the following active ingredients, each being dispersed in 500 liters of water per hectare:

(I) 2-(m-3-methylbutyn-(1)-yl-(3)-carbamoyloxy-phenyl)-4-methyl-1,2,4-oxadiazolidine-3,5-dione
(II) 2-(m-3-methylpentyn-(1)-yl-(3)-carbamoyloxy-phenyl)-4-methyl-1,2,4-oxadiazolidine-3,5-dione
(III) 2-(m-3-methylbuten-(1)-yl-(3)-carbamoyloxy-phenyl)-4-methyl-1,2,4-oxadiazolidine-3,5-dione and, for comparison, (IV) 2-(m-dimethylcarbamoyloxyphenyl)-4-methyl-1,2,4-oxadiazolidine-3,5-dione.

After 4 to 5 weeks active ingredients I, II and III showed the same good compatibility as IV with Triticum aestivum and Zea mays combined with a herbicidal action on the unwanted plants stronger than that of IV. The results of this experiment are given in the following table:

|  | Active ingredient | | | |
| --- | --- | --- | --- | --- |
|  | I | II | III | IV |
| Triticum aestivum | 5 | 0 | 0 | 5 |
| Zea mays | 0 | 0 | 0 | 0 |
| Sinapis arvensis | 100 | 95 | 100 | 80 |
| Lamium amplexicaule | 95 | 90 | 100 | 70 |
| Poa trivialis | 100 | 100 | 100 | 70 |
| Lolium perenne | 95 | 95 | 95 | 55 |
| Echinochloa crus-galli | 85 | 80 | 90 | 40 |

NOTE.—0 = no damage; 100 = complete destruction.

The action of the following compounds corresponds to that of I, II and III:

2-(m-[1-chloro-2-methylpropyl-(2)]-carbamoyloxyphenyl)-4-methyl-1,2,4-oxadiazolidine-3,5-dione;

2-(m-butyn-(1)-yl-(3)-carbamoyloxyphenyl)-4-methyl-1,2,4-oxadiazolidine-3,5-dione;

2-(m-α-chloromethylpropylcarbamoyloxyphenyl)-4-methyl-1,2,4-oxadiazolidine-3,5-dione;

2-(m-α,α-dimethylpropyn-(1)-yl-(3)-carbamoyloxyphenyl)-4-methyl-1,2,4-oxadiazolidine-3,5-dione;

2-(m-α-methallylcarbamoyloxyphenyl)-4-methyl-1,2,4-oxadiazolidine-3,5-dione.

EXAMPLE 4

The plants Triticum aestivum, Zea mays, Sinapis arvensis, Lamium amplexicaule, Poa trivialis, Lolium perenne and Echinochloa crus-galli were sprayed at a growth height of 1 to 17 cm. with 1.5 kg. per hectare of each of the following active ingredients, each being dispersed in 500 liters of water per hectare:

(I) 2-(m-3-methylbutyn-(1)-yl-(3)-carbamoyloxyphenyl)-4-methyl-1,2,4-oxadiazolidine-3,5-dione (II) 2-(m-3-methylpentyn-(1)-yl-(3)-carbamoyloxyphenyl)-4-methyl-1,2,4-oxadiazolidine-3,5-dione and, for comparison, (III) 2-(m-dimethylcarbamoyloxyphenyl)-4-methyl-1,2,4-oxadiazolidine-3,5-dione.

After 3 to 4 weeks it was ascertained that active ingredients I and II had an action on the broadleaved and grassy weeds stronger than that of active ingredient III.

The results of this experiment are given in the following table:

|  | Active ingredient | | |
| --- | --- | --- | --- |
|  | I | II | III |
| Triticum aestivum | 5 | 0 | 10 |
| Zea mays | 0 | 0 | 15 |
| Sinapis arvensis | 95 | 100 | 90 |
| Lamium amplexicaule | 85 | 95 | 65 |
| Poa trivialis | 80 | 85 | 65 |
| Lolium perenne | 75 | 80 | 55 |
| Echinochloa crus galli | 90 | 95 | 75 |

NOTE.—0 = no damage; 100 = complete destruction.

The action of the following compounds corresponds to that of I and II:

2-(m-butyn-(1)-yl-(3)-carbamoyloxyphenyl)-4-methyl-1,2,4-oxadiazolidine-3,5-dione;

2-(m-[1-chloro-2-methylpropyl-(2)]-carbamoyloxyphenyl)-4-methyl-1,2,4-oxadiazolidine-3,5-dione;

2-(m-3-methylbuten-(1)-yl-(3)-carbamoyloxyphenyl)-4-methyl-1,2,4-oxadiazolidine-3,5-dione;

2-(m-α-chloromethylpropylcarbamoyloxyphenyl)-4-methyl-1,2,4-oxadiazolidine-3,5-dione;

2-(m-α,α-dimethylpropyn-(1)-yl-(3)-carbamoyloxyphenyl)-4-methyl-1,2,4-oxadiazolidine-3,5-dione;

2-(m-α-methylallylcarbamoyloxyphenyl)-4-methyl-1,2,4-oxadiazolidine-3,5-dione.

EXAMPLE 5

An agricultural plot with Sinapis arvensis, Galinsoga parviflora, Chenopodium album, Matricaria chamomilla, Avena fatua, Poa annua and Alopecurus myosuroides growing on it was sprayed at a growth height of the plants of 3 to 8 cm. with 5 kg. per hectare of each of the following active ingredients, each dispersed in 500 liters of water per hectare:

(I) 2-(m-3-methylpentyn-(1)-yl-(3-carbamoyloxyphenyl)-4-methyl-1,2,4-oxadiazolidine-3,5-dione (II) 2-(m-3-methylbuten-(1)-yl-(3)-carbamoyloxyphenyl)-4-methyl-1,2,4-oxadiazolidine-3,5-dione (III) 2-(m-3-methylbutyn-(1)-yl-(3)-carbamoyloxyphenyl)-4-methyl-1,2,4-oxadiazolidine-3,5-dione and, for comparison, (IV) 2-chloro-4,6-bis-(ethylamino)-s-triazine.

After 6 to 7 days it was observed that the broadleaved and grassy weeds treated with active ingredients I, II and III were more heavily damaged than those treated with IV. After 4 weeks almost all the plants were completely withered.

EXAMPLE 6

An experimental plot was sown with Sinapis arvensis, Chenopodium album, Urtica urens, Stellaria media, Matricaria chamomilla, Galinsoga parviflora, Poa annua and Alopecurus myosuroides and sprayed on the same day with 10 kg. per hectare of each of the following active ingredients, each dispersed in 500 liters of water:

(I) 2-(m-3-methylpentyn-(1)-yl-(3)-carbamoyloxyphenyl)-4-methyl-1,2,4-oxadiazolidine-3,5-dione (II) 2-(m-3-methylbuten-(1)-yl-(3)-carbamoyloxyphenyl)-4-methyl-1,2,4-oxadiazolidine-3,5-dione (III) 2-(m-3-methylbutyn-(1)-yl-(3)-carbamoyloxyphenyl)-4-methyl-1,2,4-oxadiazolidine-3,5-dione.

After 4 to 5 weeks all the plants were completely withered.

EXAMPLE 7

90 parts by weight of compound I is mixed with 10 parts by weight of N-methyl-α-pyrrolidone. A mixture is obtained which is suitable for application in the form of very fine drops.

EXAMPLE 8

20 parts by weight of compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 9

20 parts by weight of compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 10

20 parts by weight of compound I is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 11

20 parts by weight of compound II is well mixed with 3 parts by weight of the sodium salt of diisobutylnaphthalene-α-sulfonic acid, 17 parts by weight of the sodium salt of ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 12

3 parts by weight of compound III is intimately mixed with 97 parts by weight of particulate kaolin. A dust is obtained containing 3% by weight of the active ingredient.

EXAMPLE 13

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted 1,2,4-oxadiazolidine-3,5-dione selected from the group consisting of 2-(m-3-methylpentyn-(1)-yl-(3)-carbamoyloxyphenyl) - 4 - methyl-1,2,4-oxadiazolidine-3,5-dione; 2 - (m-3-methylbuten-(1)-yl-(3)-carbamoyloxyphenyl)-4-methyl-1,2,4-oxadiazolidine - 3,5 - dione; and 2 - (m - 3 - methylbutyn-(1)-yl-(3)-carbamoyloxyphenyl)-4-methyl-1,2,4-oxadiazolidine-3,5-dione.

2. 2-(m-3-methylpentyn - (1) - yl - (3) - carbamoyloxyphenyl)-4-methyl-1,2,4-oxadiazolidine-3,5-dione.

3. 2-(m-3-methylbuten - (1) - yl - (3) - carbamoyloxyphenyl)-4-methyl-1,2,4-oxadiazolidine-3,5-dione.

4. 2-(m-3-methylbutyn - (1) - yl - (3) - carbamoyloxyphenyl)-4-methyl-1,2,4-oxadiazolidine-3,5-dione.

References Cited
UNITED STATES PATENTS 3,632,599   1/1972   Zschocke et al. _____ 260—307

RAYMOND V. RUSH, Primary Examiner

U.S. Cl. X.R.

71—92